Aug. 11, 1925.
R. RODGERS
CONDIMENT HOLDER
Filed Feb. 21, 1924
1,549,049
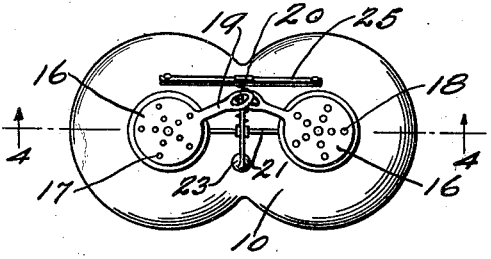
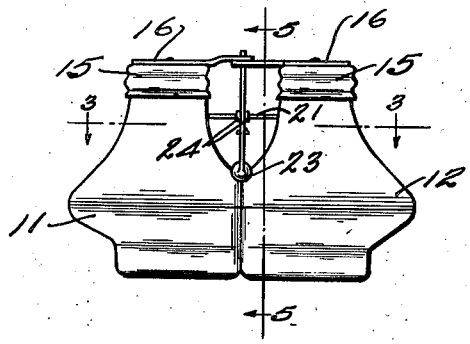 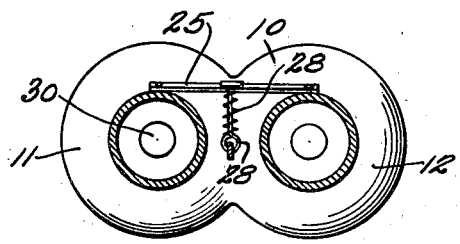
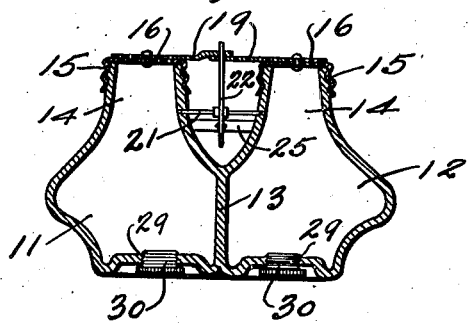 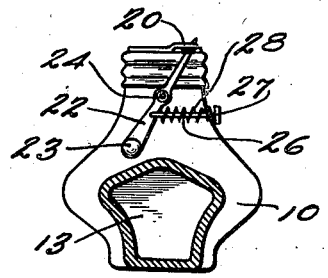
Inventor
Rex Rodgers Patented Aug. 11, 1925.

1,549,049

UNITED STATES PATENT OFFICE.

REX RODGERS, OF DALTON, NEBRASKA.

CONDIMENT HOLDER.

Application filed February 21, 1924. Serial No. 694,295.

*To all whom it may concern:*

Be it known that I, REX RODGERS, a citizen of the United States, residing at Dalton, in the county of Cheyenne and State of Nebraska, have invented certain new and useful Improvements in a Condiment Holder, of which the following is a specification.

This invention relates to improvements in condiment holders, and more particularly to that class adapted for use as a salt-and-pepper shaker. An important object of the invention is to provide a condiment holder which is so constructed as to contain a plurality of individual compartments.

A further object of the invention is to provide a condiment holder of this character which has novel means of operating the perforated disks to permit use thereof. A still further object of the invention is to provide means upon a condiment holder whereby one compartment may be opened while the other is closed.

Other objects and advantages of this invention will be apparent in the course of the following description.

In the accompanying drawing, forming a part of this specification, and in which like numerals are employed to designate like parts throughout the same:

Figure 1 is a top plan view of the device comprising my invention,

Figure 2 is a side elevation of the same,

Figure 3 is a horizontal section taken on the line 3—3 of Figure 2,

Figure 4 is a longitudinal vertical section taken on the line 4—4 of Figure 1, and Figure 5 is a transverse vertical section taken on the line 5—5 of Figure 2.

In the drawings, wherein for the purpose of illustration is shown the preferred embodiment of my invention, the numeral 10 generally denotes the condiment holder which is provided with a pair of compartments more specifically designated by the numeral 11 which indicates the pepper compartment and the numeral 12 denoting the salt compartment.

The center of the condiment holder 10 has a vertical partition 13 formed therein, this partition dividing the holder into the compartments 11 and 12, and preventing mixture of the matter therein. Each of the compartments has a neck 14 formed on the upper end, the extremity thereof being provided with external threads in order to receive a pair of threaded caps 15.

The perforated caps 15 carry a pair of rotatable disks 16, the disk mounted upon the pepper compartment being provided with comparatively small perforations 17, while that carried by the salt compartment has slightly larger perforations denoted by the numeral 18. The perforations in the caps and disks are so arranged that rotation of the disks will cause the perforations formed in one disk aligning with the cap during one operation, while the other disk will be so positioned as to entirely cover the perforations in the cap and prevent matter from issuing from this compartment.

In order that the disks 16 may be conveniently operated by the user while shaking the condiment holder, I provide an operating mechanism consisting of a pair of extending arms 19 formed integral with the disks 16 or secured thereto, the ends of the arms 19 being provided with elongated loops 20. Mounted upon a pivot rod 21 is a swinging lever 22 the lower extremity thereof being provided with an actuating ball 23, and the upper extremity tapering to a point adapted to penetrate the loops 20 formed on the extension arms. At about its mid-section the swinging lever 22 is provided with an opening which is penetrated by the pivot rod 21 and acts as a bearing for the lever. I provide a pair of washers 24 securely fastened to the pivot rod 21 on both sides of the lever 22 thereby preventing side movement thereof.

A supporting bar 25 is secured to the side of the condiment holder slightly below the cap and supports a spring rod 26 which is secured to the swinging lever 22 and adapted to move through a suitable opening formed in the supporting bar. A disk 27 is secured to one extremity of the spring rod 26 to prevent displacement thereof, a coil spring 28 being positioned on the inner side of the rod 26 between the supporting bar 25 and the lever 22, thereby forcing the lever away from the supporting bar.

The bottoms of the compartments 11 and 12 are provided with threaded openings 29 which are adapted to receive the pair of threaded plugs 30.

In use, the device may be employed as a combination salt-and-pepper shaker, the compartments being filled through the bottom by removal of the plugs 30 and inserting pepper in one compartment and salt in the other. In the natural position the bottom of the lever 22 will be forced away from the body of the condiment holder as shown in Figure 5, in this position the disk 18 mounted upon the salt compartment will have the perforations formed therein aligned with those formed in the cap thereby permitting the device to be employed as a salt shaker only.

When it is desired to discharge pepper from the holder the swinging lever 22 is moved by forcing the ball 23 formed on the lower extremity thereof, against the body of the holder, thereby causing rotation of the disks and closing the salt compartment while aligning the perforations in the disk 17 with those formed in the cap on the pepper compartment. Obviously the user may discharge either salt or pepper as desired from the single condiment holder and thus materially lessening confusion about the dining table.

It is to be understood that the form of my invention herewith shown and described is to be taken as a preferred example of the same, and that various changes as to shape, size and arrangement of parts may be resorted to without departing from the spirit of the invention or the scope of the subjoined claim.

Having thus described my invention, I claim:

A condiment holder comprising a container having a pair of spaced neck portions, a pivot pin located between the neck portions and bridging the space between them, a lever fulcrumed upon the pivot pin, a bar adapted to bear at its ends against the sides of the neck portions and disposed approximately parallel with the pivot pin, a spring bearing at one end against the bar and at its opposite end against the lever at one side of the fulcrumed point, perforated caps mounted upon the neck portions, perforated disks pivotally mounted upon the cap and having radially disposed arms provided with slots which loosely receive the upper end portion of the lever.

In testimony whereof, I have affixed my signature in the presence of two witnesses.

REX RODGERS.

Witnesses:
J. M. KREADER,
H. T. HEDLUND.